(12) United States Patent
Yamazaki et al.

(10) Patent No.: US 11,820,435 B2
(45) Date of Patent: Nov. 21, 2023

(54) MOUNTING STRUCTURE OF VEHICLE SENSOR

(71) Applicant: HONDA MOTOR CO., LTD., Tokyo (JP)

(72) Inventors: Ryosuke Yamazaki, Wako (JP); Takashi Yanagi, Wako (JP); Kazuya Konada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 17/674,994

(22) Filed: Feb. 18, 2022

(65) Prior Publication Data
US 2022/0289303 A1 Sep. 15, 2022

(30) Foreign Application Priority Data
Mar. 9, 2021 (JP) .................................. 2021-037159

(51) Int. Cl.
*B60R 19/48* (2006.01)
*B62D 25/08* (2006.01)

(52) U.S. Cl.
CPC ............ *B62D 25/085* (2013.01); *B60R 19/48* (2013.01); *B60R 19/483* (2013.01)

(58) Field of Classification Search
CPC ....... B62D 25/085; B60R 11/04; B60R 19/48; B60R 19/483; B60R 19/023; B60R 19/42; B60R 2019/1886; G01D 11/245; G01D 11/30
USPC .......................... 293/117, 2, 120; 296/193.09
See application file for complete search history.

(56) References Cited

U.S. PATENT DOCUMENTS

| 11,313,705 | B2 * | 4/2022 | Kato ..................... G01S 13/931 |
| 2005/0077711 | A1 * | 4/2005 | Yasui .................... B62D 25/04 |
| | | | 296/193.09 |
| 2013/0103274 | A1 * | 4/2013 | Binder .................. G01N 21/41 |
| | | | 701/1 |
| 2016/0347270 | A1 * | 12/2016 | Higashimachi ......... B60R 19/04 |
| 2017/0240128 | A1 * | 8/2017 | Kashiwagi .............. B60R 19/48 |
| 2017/0297521 | A1 * | 10/2017 | Sugie .................... G01S 15/931 |
| 2018/0236958 | A1 * | 8/2018 | Horiuchi .............. B62D 25/082 |

(Continued)

FOREIGN PATENT DOCUMENTS

| JP | 2005280666 A | * 10/2005 |
| JP | 2013-205196 A | 10/2013 |

(Continued)

OTHER PUBLICATIONS

Kobayashi Masakazu, JP 2015-147486 A, "suspension control system and vehicle", ip.com, machine translation, Aug. 20, 2015 (Year: 2015).*

(Continued)

*Primary Examiner* — Amy R Weisberg
*Assistant Examiner* — Wenwei Zhuo
(74) *Attorney, Agent, or Firm* — Rankin, Hill & Clark LLP

(57) ABSTRACT

A mounting structure of a vehicle sensor includes: an exterior member provided at a front side of a vehicle body; a frame member configured to support the exterior member or a drive source for driving a vehicle; and a road surface condition detector configured to detect a road surface condition at a front side of the vehicle. The road surface condition detector is fixed to a frame member located frontward of a front wheel.

8 Claims, 4 Drawing Sheets

(56) References Cited

U.S. PATENT DOCUMENTS

| | | | |
|---|---|---|---|
| 2020/0156576 A1* | 5/2020 | Kataoka | B60R 19/483 |
| 2021/0291767 A1* | 9/2021 | Momii | G01D 11/245 |
| 2022/0297497 A1* | 9/2022 | Yamazaki | B60G 17/0161 |

FOREIGN PATENT DOCUMENTS

| | | | |
|---|---|---|---|
| JP | 2015-147486 A | | 8/2015 |
| JP | 2015147486 A | * | 8/2015 |
| JP | 2017-193223 A | | 10/2017 |
| JP | 2019-152580 A | | 9/2019 |

OTHER PUBLICATIONS

Hirata, Motoharu, JP 2005-280666 A, "Collision detection sensor arrangement structure of automobile", ip.com, machine translation, Oct. 13, 2005 (Year: 2005).*

Office Action received in corresponding Japanese application No. 2021-037159 dated Aug. 23, 2022 with English translation (6 pages).

\* cited by examiner

MOUNTING STRUCTURE OF VEHICLE SENSOR

CROSS-REFERENCE TO RELATED APPLICATION

This application claims the benefit of foreign priority to Japanese Patent Application No. 2021-037159, filed on Mar. 9, 2021, which is incorporated by reference in its entirety.

TECHNICAL FIELD

The invention relates to a mounting structure of a vehicle sensor.

BACKGROUND

Japanese Patent Laid-open Publication No. 2013-205196 discloses, as a mounting structure of a road surface condition detector (projection device 12 and camera 18) configured to detect road surface conditions, a technique for mounting the road surface condition detector on a bumper of a vehicle.

However, according to the mounting structure of a road surface condition detector disclosed in JP 2013-205196 A, because of the fact that the rigidity of the bumper is low, the road surface condition detector resonates during the traveling of the vehicle, which leads to a decrease in detection accuracy. Further, if the road surface condition detector is mounted on the bumper, the bumper may droop under its own weight due to aging of a fixing means, which may affect the detection accuracy.

In view of the above, it is an object of the present invention to provide a mounting structure of a vehicle sensor capable of obtaining stable detection accuracy.

SUMMARY

According to one aspect of the present invention, there is provided a mounting structure of a vehicle sensor comprising: an exterior member provided at a front side of a vehicle body; a frame member configured to support the exterior member or a drive source for driving a vehicle; and a road surface condition detector configured to detect a road surface condition at a front side of the vehicle. The road surface condition detector is fixed to a frame member located frontward of a front wheel.

BRIEF DESCRIPTION OF THE DRAWINGS

The drawings described herein are for illustration purposes only and are not intended to limit the scope of the present invention in any way.

DETAILED DESCRIPTION

A mounting structure of a vehicle sensor according to one embodiment of the present invention is described in detail with reference to the drawings as appropriate. The mounting structure of the vehicle sensor is illustrated in a simplified form for convenience of explanation, and is not limited to this specific embodiment. In the following description, a "front (frontward direction)" refers to a forward traveling direction of a vehicle, a "rear (rearward direction)" refers to a reversing direction of the vehicle, an "upper (upward direction)" refers to a vertically upward direction of the vehicle, a "lower (downward direction)" refers to a vertically downward direction of the vehicle, and "right" and "left" directions refer to corresponding directions in a vehicle width direction (i.e., lateral direction or right-left direction) of the vehicle. Because the mounting structure of the vehicle sensor has a right-left symmetrical shape, the following description is mainly directed to one side (left side) thereof and the description of the other side (right side) is omitted where appropriate.

Figure 1:
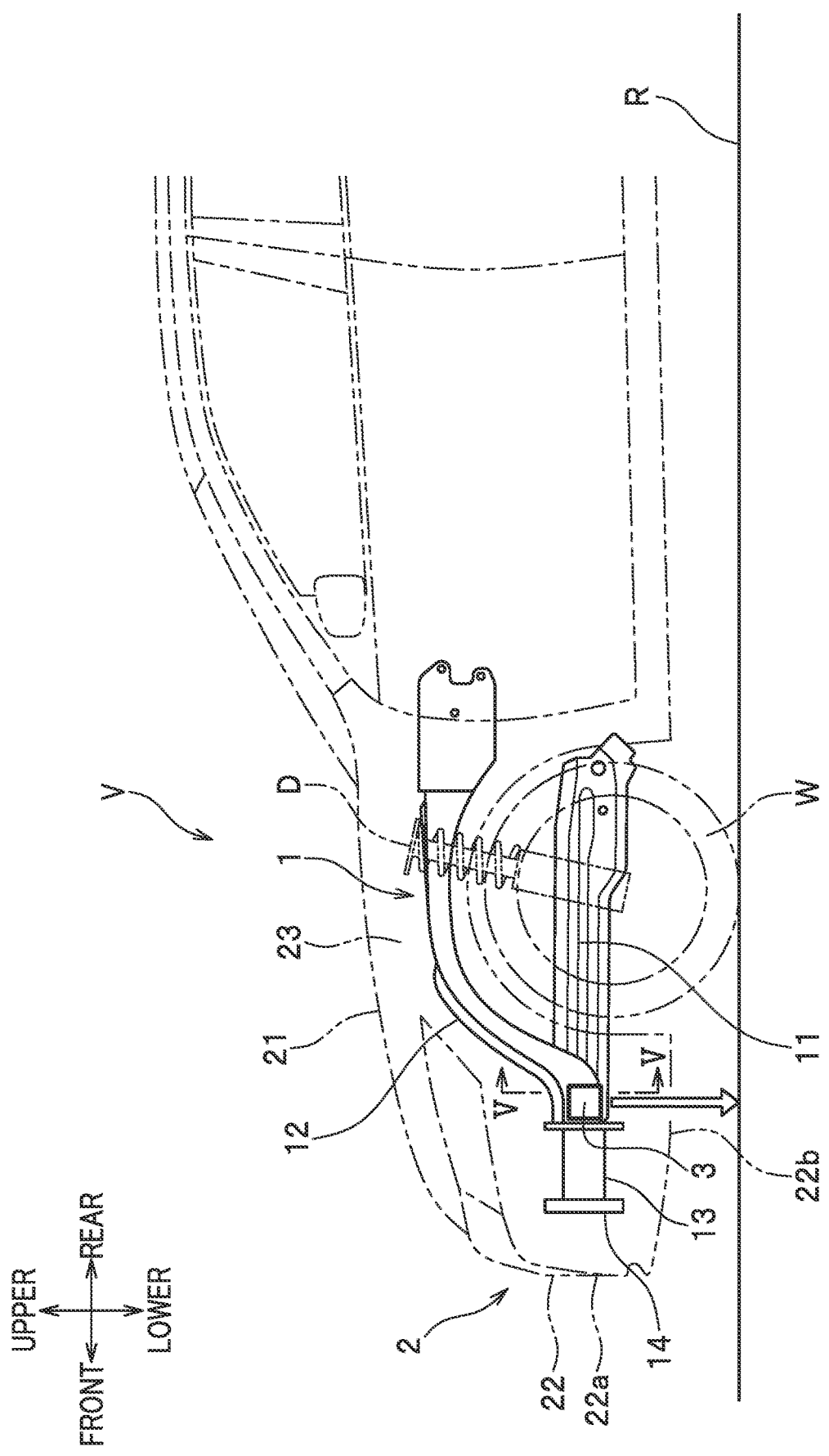
FIG. 1 is a side view showing a mounting structure of a vehicle sensor according to one embodiment of the present invention.

FIG. 1 is a side view showing a mounting structure of a vehicle sensor according to one embodiment of the present invention. In FIG. 1, the outline of a vehicle V is indicated by the chain double-dashed line.

As seen in FIG. 1, a mounting structure of a vehicle sensor is provided by fixing a road surface condition detecting device (road surface condition detector) 3 as a vehicle sensor to a vehicle body member 1 that forms the vehicle body of the vehicle.

The vehicle V mainly includes a vehicle body member 1, an exterior member 2 that forms an outer part (outline) of the vehicle V, and a road surface condition detecting device 3 configured to detect road surface conditions. As long as the vehicle V is an automobile equipped with a vehicle body member 1, an exterior member 2, and a road surface condition detecting device 3, the type or the kind thereof is not limited. In other words, the vehicle V may be a passenger car, a bus, a truck, and a work truck.

The vehicle body member 1 supports the exterior member 2. The vehicle body member 1 includes a front side frame 11 (frame member), an upper member 12 (frame member), a bumper beam extension 13, a bumper beam 14 (frame member), and the like.

The exterior member 2 includes an engine hood 21, a front bumper 22 (bumper), and a front fender 23. The engine hood 21 is a panel member configured to cover the upper surface of the front side of the vehicle body that is located in front of a windshield. The front bumper 22 is disposed on the front side of the vehicle V, and is formed with a panel member, for example, made of synthetic resin. The front bumper 22 has a front portion 22a in which an air intake is formed, and a bottom portion 22b extending rearward from a lower end of the front portion 22a. The front fender 23 is a panel member configured to cover the periphery of a front wheel W.

The road surface condition detecting device 3 is a sensor (damper controlling sensor) configured to detect conditions of a road surface R (road surface conditions) at the front side of the vehicle V and to control a damper D of the vehicle V. The road surface condition detecting device 3 is fixed to the upper member 12 located frontward of the front wheel W. As shown by the thick solid arrow of FIG. 1, the road surface condition detecting device 3 according to this embodiment is configured to detect a condition of the road surface R immediately in front of the front wheel W. The road surface condition detecting device 3 can be selected from various types of sensors such as radar type, camera type, laser type sensors. The road surface condition detecting device 3 is not limited to a single sensor, but may be a combination of a plurality of different types of sensors such as a camera type sensor and a laser type sensor.

Figure 2:
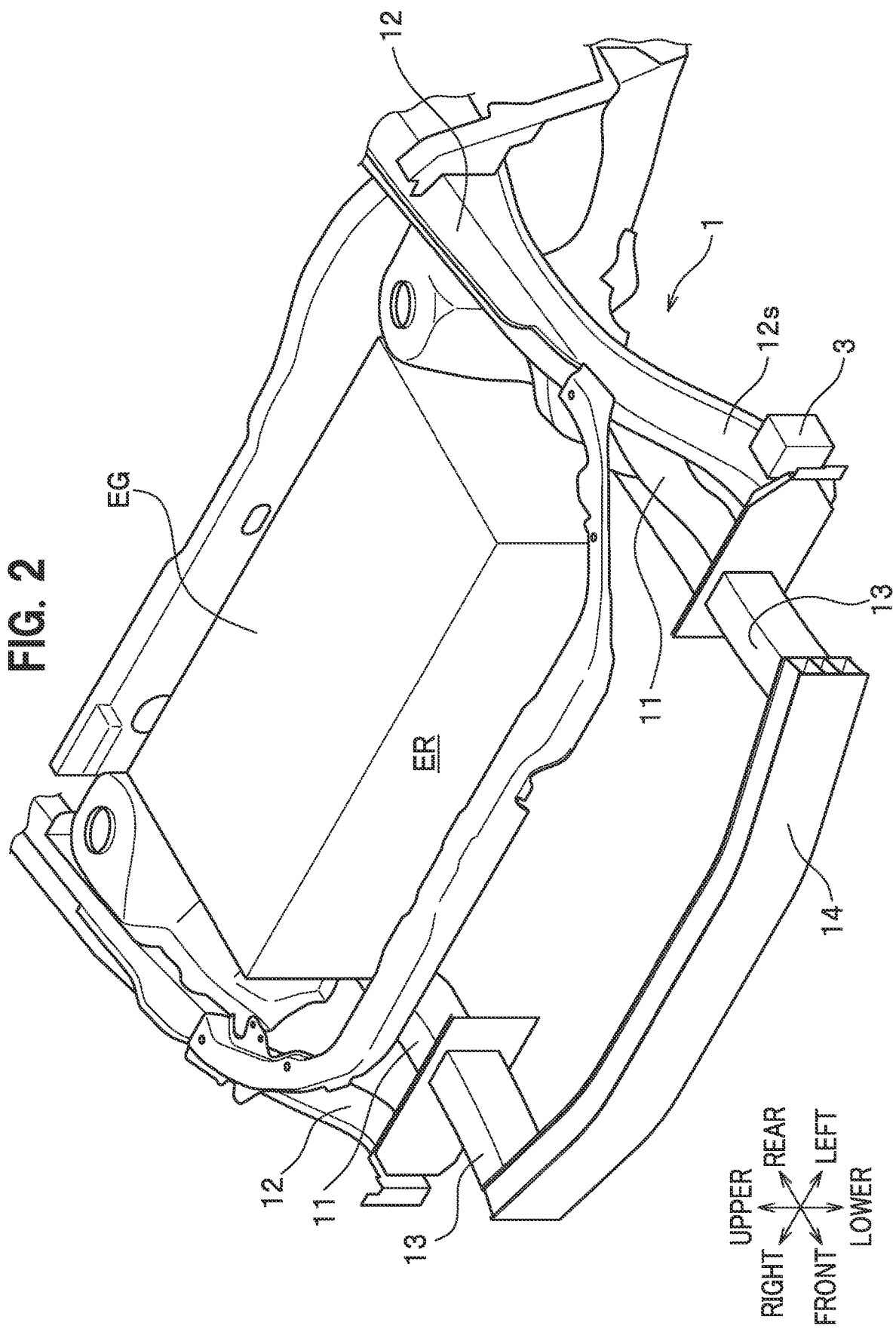
FIG. 2 is a perspective view showing the mounting structure of the vehicle sensor according to this embodiment as seen from a front side of a vehicle body.

FIG. 2 is a perspective view showing the mounting structure of the vehicle sensor according to this embodiment as seen from the front side of the vehicle body.

As seen in FIG. 2, the front side frame 11 is a pair of right and left frame members extending, through the bumper beam extension 13, in the rearward direction of the vehicle body from a position near the right and left ends of the bumper beam 14.

The upper member 12 is a pair of right and left frame members extending from a front lower end portion to a rear upper end portion of a side portion of an engine room ER (extending in the frontward direction from above the front wheel W), in which an engine EG (drive source) for driving the vehicle V (see FIG. 1) is mounted. Although not shown in the drawings, the engine EG is supported by the right and left front side frames 11 via the subframes.

The room in which the drive source is mounted is not limited to the engine room ER and may be a motor room in which a motor for driving an electric vehicle is accommodated. Further, the room in which the drive source is mounted may be a room for accommodating a power storage device that supplies power to a driving motor.

A front end portion of the upper member 12 is connected to the bumper beam extension 13 that is attached to right and left end portions of the bumper beam 14. The bumper beam extension 13 is a bumper member made of metal and configured to absorb an impact load by crushing and buckling upon collision of the vehicle V. The bumper beam extension 13 is a tubular member provided at right and left end portions in the vehicle width direction of the bumper beam 14. The bumper beam extension 13 is disposed between the bumper beam 14 and the front side frame 11.

The bumper beam 14 is a frame member extending in the vehicle width direction. The bumper beam 14 is made of a steel product having a vertically long rectangular cross-section as seen in a longitudinal section. Further, a cushioning material (not shown) extending in the vehicle width direction is attached to the front side of the bumper beam 14. A front bumper 22 (see FIG. 1) is fixed to the front side of the bumper beam 14.

The road surface condition detecting device 3 is mounted on a laterally outer side surface 12s of the upper member 12. The road surface condition detecting device 3 is located at a front end portion of the upper member 12 in the front-rear direction.

Figure 3:
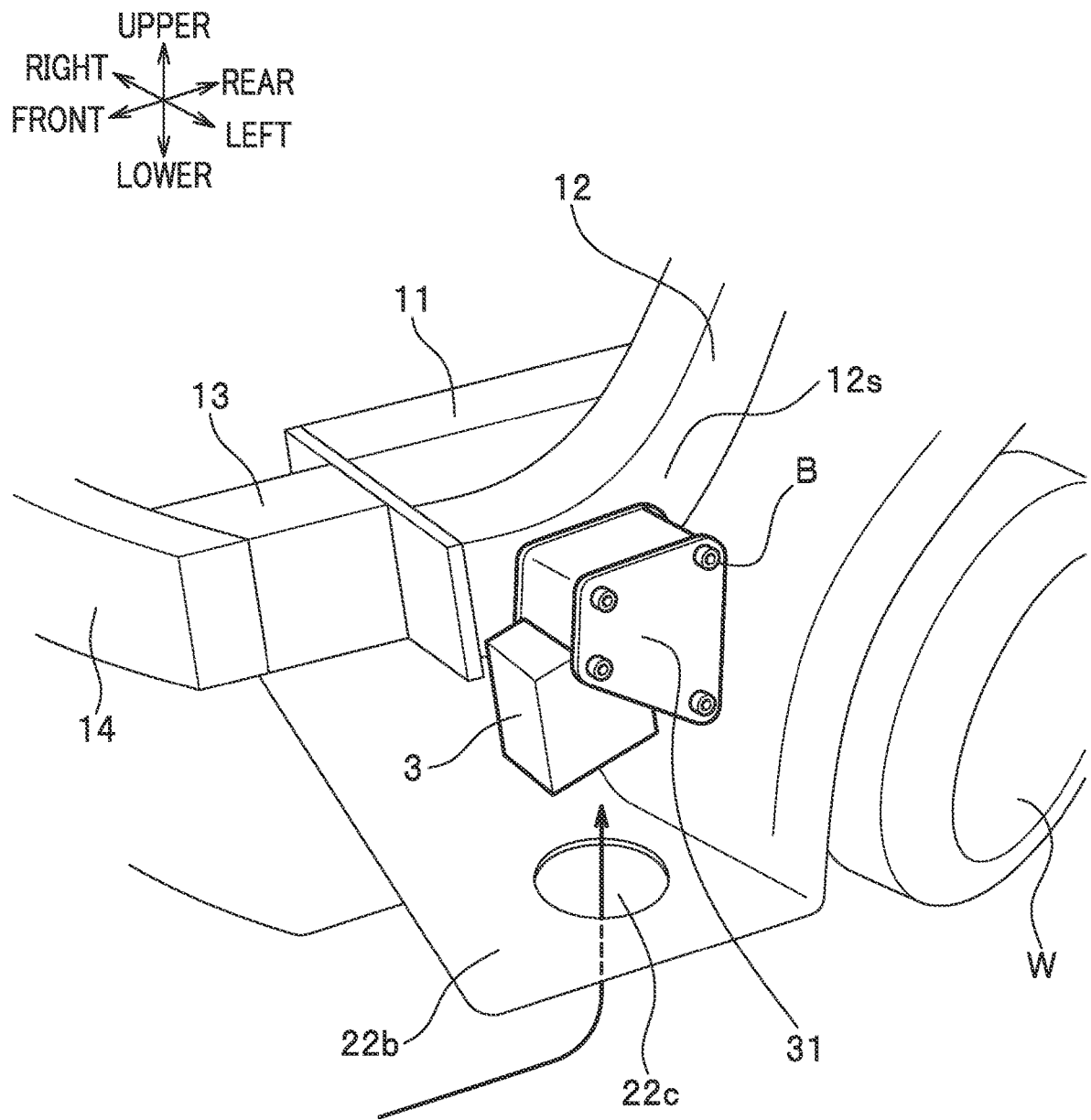
FIG. 3 is a partially enlarged perspective view showing the mounting structure of the vehicle sensor according to this embodiment as seen from the front side of the vehicle body.

FIG. 3 is a partially enlarged perspective view showing the mounting structure of the vehicle sensor according to this embodiment as seen from the front side of the vehicle body.

As seen in FIG. 3, the road surface condition detecting device 3 is fixed to the side surface 12s of the upper member 12 through a bracket 31.

The bracket 31 is made of metal, such as iron or aluminum alloy. The bracket 31 extends laterally outward in the right-left direction (width direction) from the side surface 12s of the upper member 12. The bracket 31 has an opening at its lower portion, and the road surface condition detecting device 3 is fixed to the bracket 31 with a part of the road surface condition detecting device 3 inserted into the opening. The embodiment shown in FIG. 3 is provided as an illustrative example, and the present invention is not limited to this specific embodiment.

Further, an opening 22c is formed in a bottom portion 22b of the front bumper 22 in a position under or below the road surface condition detecting device 3. With this configuration, an air stream (air) can be taken in from outside to inside of the opening 22c during traveling of the vehicle, so that foreign matter, such as dust, attached to the road surface condition detecting device 3 can be blown away. This results in stable detection accuracy of the road surface condition detecting device 3.

Further, the opening 22c formed in the bottom portion 22b of the front bumper 22 in a position under or below the road surface condition detecting device 3 makes it possible to allow a laser beam emitted from the road surface condition detecting device 3 to be irradiated directly on the road surface R through the opening 22c. It is therefore possible to detect road surface conditions with a high degree of accuracy.

The position to which the road surface condition detecting device 3 is fixed to the upper member 12 is not limited to the side surface 12s of the upper member 12, and may be fixed to the front surface or the lower surface of the upper member 12.

Figure 4:
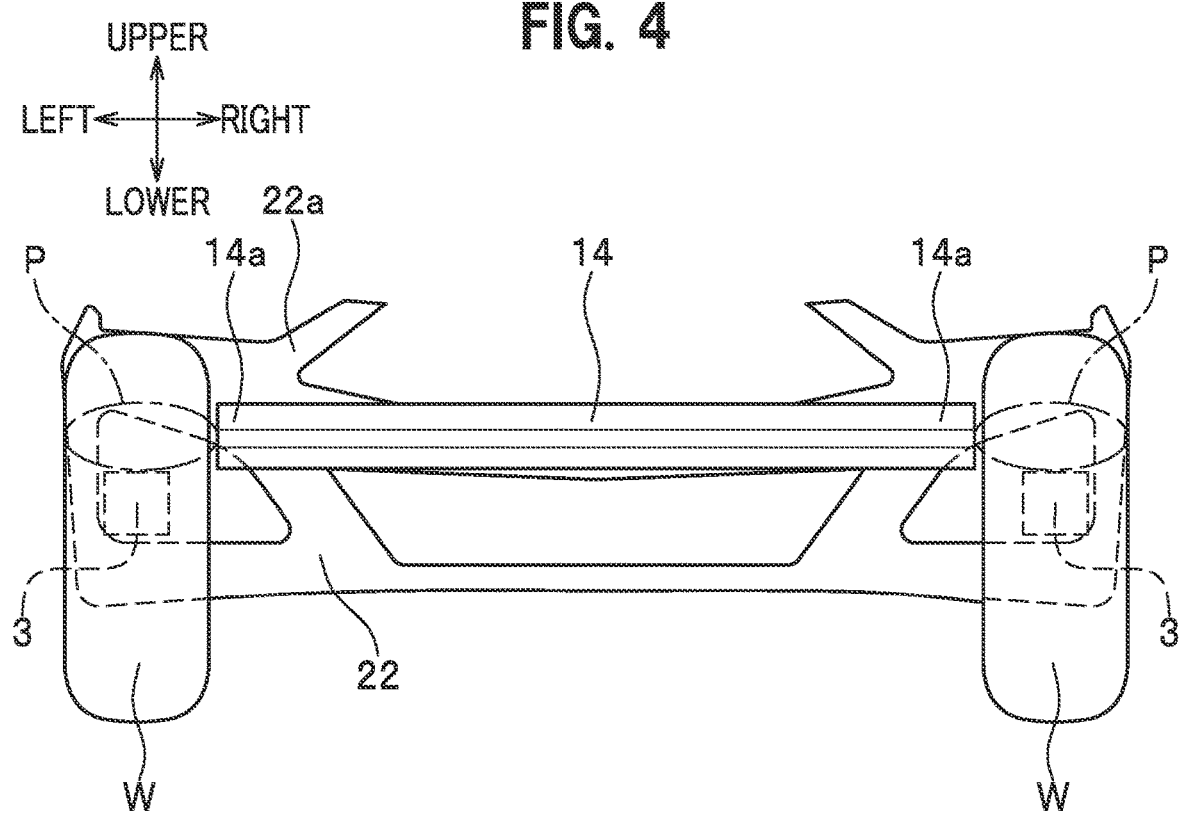
FIG. 4 is a schematic sectional view showing the mounting structure of the vehicle sensor according to this embodiment as seen from behind a front wheel.

FIG. 4 is a schematic sectional view showing the mounting structure of the vehicle sensor according to this embodiment as seen from behind the front wheel.

As shown in FIG. 4, right and left end portions 14a, 14a (in the vehicle width direction) of the bumper beam 14 may not extend to positions immediately in front of the front wheels W (see areas P surrounded by dashed lines). In this configuration, it is difficult to install the road surface condition detecting device 3 in a position immediately in front of the front wheel W.

According to this embodiment, the road surface condition detecting device 3 is installed on the upper member 12 (see FIG. 3) that is a frame member of the vehicle V. With this configuration, the road surface condition detecting device 3 can be installed in a position immediately in front of the front wheel W, so that it is possible to detect road surface conditions in front of the front wheel W and to obtain road surface information with a high degree of precision.

Figure 5:
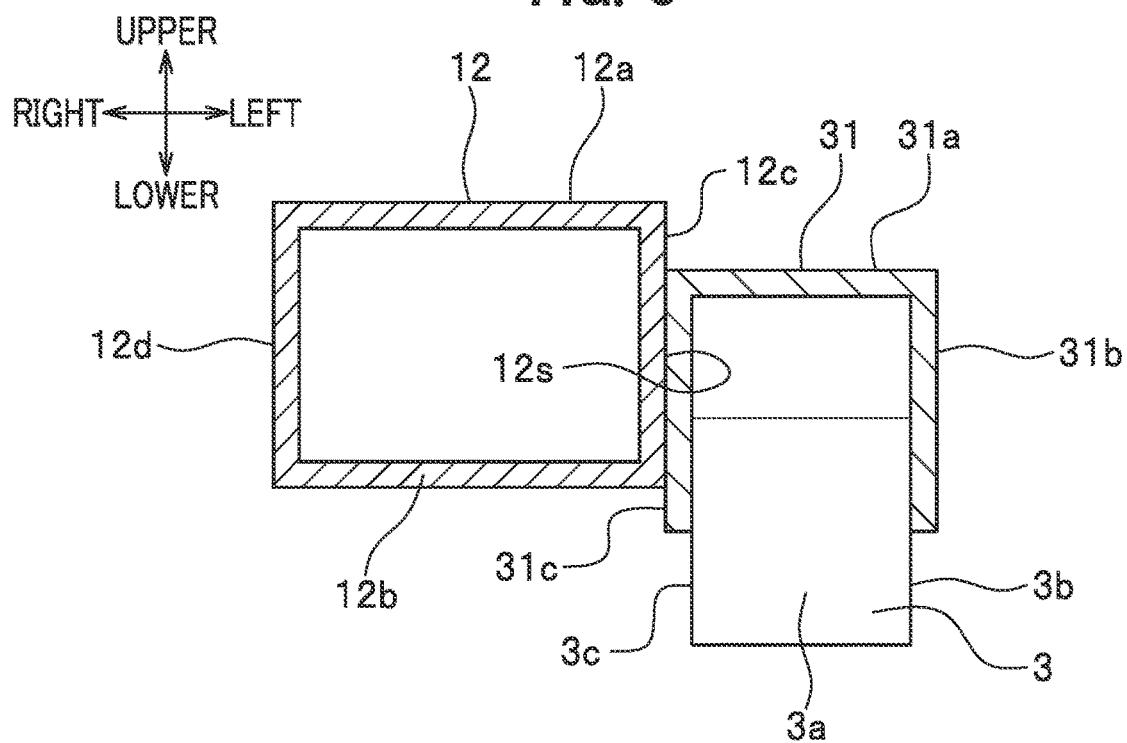
FIG. 5 is a cross-sectional view taken along the line V-V of FIG. 1.

FIG. 5 is a cross-sectional view taken along the line V-V of FIG. 1.

As seen in FIG. 5, the upper member 12 has an upper portion 12a, a lower portion 12b, a left portion 12c, and a right portion 12d. The upper member 12 is formed in a rectangular closed cross-sectional shape consisting of the upper portion 12a, the lower portion 12b, the left portion 12c, and the right portion 12d. The rigidity of the upper member 12 can be increased by this closed cross-section.

The bracket 31 to be fixed to the upper member 12 is made of metal such as iron. The bracket 31 has an upper portion 31a, a left portion 31b, and a right portion 31c. When viewed in a cross-section, the bracket 31 is formed in a portal (gate) shape consisting of the upper portion 31a, the left portion 31b, and the right portion 31c. The right portion 31c is in surface-to-surface contact with the left portion 12c of the upper member 12. The bracket 31 is fixed to the upper member 12 by bolts B (see FIG. 3). The upper member 12 and the bracket 31 may be fixed by welding.

The road surface condition detecting device 3 includes a square box-shaped case 3a. The road surface condition detecting device 3 is fixed with a left side surface 3b and a right side surface 3c of the case 3a being retained by the bracket 31. The road surface condition detecting device 3 and the bracket 31 are fixed, for example, by bolts.

Since the bracket 31 is fixed with the right and left sides of the road surface condition detecting device 3 being sandwiched between the left portion 31b and the right portion 31c of the bracket 31, it is possible to protect the road surface condition detecting device 3 from an impact coming from the left side.

As described above, the mounting structure of a vehicle sensor according to this embodiment includes; the exterior member 2 (engine hood 21, front bumper 22, front fender 23) provided at the front side of the vehicle body; the frame member (front side frame 11, upper member 12, bumper beam 14) configured to support the exterior member 2; and the road surface condition detecting device 3 configured to detect road surface conditions at the front side of the vehicle. The road surface condition detecting device 3 is fixed to the frame member (front side frame 11, upper member 12, bumper beam 14) located frontward of the front wheel W (see FIGS. 1 to 3). According to this configuration, since the road surface condition detecting device 3 is mounted on the frame member, it is possible to prevent resonance in the road surface condition detecting device 3 and to obtain stable detection accuracy. As a result, the road surface information with a high degree of precision can be obtained.

According to this embodiment, the road surface condition detecting device 3 is fixed in a position overlapping the front wheel W as viewed from the rear side of the vehicle (see FIG. 4). With this configuration, an error is reduced with respect to the front wheel W and the road surface information with a high degree of precision can be obtained.

According to this embodiment, the frame member is the upper member 12 extending in the frontward direction from above the front wheel W, and the road surface condition detecting device 3 is fixed to the side of the upper member 12 (see FIGS. 2 and 3). With this configuration, the mounting rigidity of the road surface condition detecting device 3 can be increased, and vibration and resonance caused by insufficient rigidity can be reduced.

According to this embodiment, the upper member 12 has a closed cross-section (see FIG. 5). With this configuration, the mounting rigidity of the road surface condition detecting device 3 can be further increased, and vibration and resonance caused by insufficient rigidity can be reduced.

According to this embodiment, the exterior member 2 is the front bumper 22, and the front bumper 22 has the opening 22c under or below the road surface condition detecting device 3 (see FIG. 3). With this configuration, an air stream can be taken in from the opening 22c during traveling of the vehicle, so that dust attached to the road surface condition detecting device 3 can be blown away. As a result, the road surface information with a high degree of precision can be stably obtained.

According to this embodiment, the exterior member 2 is the front bumper 22, and the road surface condition detecting device 3 is fixed behind the bumper beam 14 configured to support the front bumper 22 and extending in the vehicle width direction (see FIG. 1). This configuration can prevent a positional shift of the road surface condition detecting device 3 in a minor collision such as deformation in the bumper or the outer plate, the service work required for adjustment of the road surface condition detecting device 3 can be reduced.

Further, according to this embodiment, the road surface condition detecting device 3 is fixed to the frame member (upper member 12) through the bracket 31, and the bracket 31 extends outward in the vehicle width direction beyond the road surface condition detecting device 3. With this configuration, the mounting rigidity of the road surface condition detecting device 3 can be increased, and vibration and resonance caused by insufficient rigidity can be reduced.

Although one embodiment of the present invention has been described above, the present invention is not limited to this specific embodiment. For example, instead of the configuration in which the road surface condition detecting device 3 is mounted on the side surface 12s (left side surface) of the front end of the upper member 12, the road surface condition detecting device 3 may be mounted on the front side frame 11 that is the frame member located frontward of the front wheel W.

What is claimed is:

1. A mounting structure of a vehicle sensor comprising:
   an exterior member provided at a front side of a vehicle body;
   a frame member configured to support the exterior member or a drive source for driving a vehicle; and
   a road surface condition detector as the vehicle sensor configured to detect a road surface condition at a front side of the vehicle, wherein
   the road surface condition detector is fixed to the frame member located frontward of a front wheel,
   the exterior member is a bumper having a front portion and a bottom portion extending rearward from a lower end of the front portion,
   the bumper has an opening under or below the road surface condition detector, and
   the opening is formed in the bottom portion.

2. The mounting structure according to claim 1, wherein the road surface condition detector is fixed in a position overlapping the front wheel as viewed from a rear side of the vehicle.

3. The mounting structure according to claim 1, wherein the frame member is an upper member extending in a frontward direction from above the front wheel, and the road surface condition detector is fixed to a side of the upper member.

4. The mounting structure according to claim 3, wherein the upper member has a closed cross-section.

5. The mounting structure according to claim 1, wherein the road surface condition detector is fixed behind a bumper beam configured to support the bumper and extending in the vehicle width direction.

6. The mounting structure according to claim 1, wherein the road surface condition detector is fixed to the frame member through a bracket, and the bracket extends outward in the vehicle width direction beyond the road surface condition detector.

7. The mounting structure according to claim 1, wherein the road surface condition detector detects the road surface condition through the opening.

8. The mounting structure according to claim 7, wherein the opening is disposed directly below the road surface condition detector, and the road surface condition detector emits a laser beam on a road surface through the opening.

* * * * *